United States Patent [19]

Smith, Jr.

[11] Patent Number: 5,323,321
[45] Date of Patent: Jun. 21, 1994

[54] LAND VEHICLE NAVIGATION APPARATUS

[75] Inventor: Bernard C. Smith, Jr., Arlington Heights, Ill.

[73] Assignee: Motorola, Inc., Schaumburg, Ill.

[21] Appl. No.: 543,319

[22] Filed: Jun. 25, 1990

[51] Int. Cl.⁵ .................................. G06F 15/50
[52] U.S. Cl. .................... 364/449; 369/444; 340/990; 340/995
[58] Field of Search .......... 364/443, 444, 449; 73/178 R; 340/988, 990, 995

[56] References Cited

U.S. PATENT DOCUMENTS

| | | | |
|---|---|---|---|
| 4,758,959 | 7/1988 | Thoone et al. | 364/449 |
| 4,774,672 | 9/1988 | Tsunoda et al. | 340/995 |
| 4,791,574 | 12/1988 | Thoone et al. | 364/457 |
| 4,796,189 | 1/1989 | Nakayama et al. | 364/449 |
| 4,937,570 | 6/1990 | Matsukawa et al. | 340/988 |
| 4,937,752 | 6/1990 | Nanba et al. | 340/995 |

FOREIGN PATENT DOCUMENTS

| | | |
|---|---|---|
| 306075A1 | 8/1989 | European Pat. Off. . |
| 306088A1 | 8/1989 | European Pat. Off. . |

OTHER PUBLICATIONS

Autoguide-Route Guidance in the United Kingdom CH2789-6/89/0000-0467 1989 IEEE pp. 467-473.

Phillips Technical Review Volume 43, No. 11/12, Dec. 1987, Carin, a car information and navigation system.

Primary Examiner—Gary Chin
Attorney, Agent, or Firm—Phillip H. Melamed

[57] ABSTRACT

A land vehicle navigation apparatus (10) has a vehicle navigation computer (11) which determines a navigation route and provides vehicle maneuver visual displays on a CRT display (13). The displays are preferably provided in the form of graphic arrow representations (26, 28) which are illustrated in perspective form with a tail of the arrow (26B, 28B) shown in the foreground and towards to the bottom of a display screen (20) and the head of the arrow (26A, 28A) shown in the background. A visual display of an effective bar graph, indicating the additional distance to be traveled prior to execution of the visually displayed vehicle maneuver, is visually provided and superimposed on the visually displayed vehicle maneuver graphic arrow. The bar graph comprises a series of stack horizontal bars (27, 29) superimposed on the arrow (26, 28) which is preferably shown in three dimensional form. This type of visual display more readily communicates to the vehicle operator the type of vehicle maneuver to be implemented and the time at which it is to be implemented, while utilizing a minimum amount of display space and requiring minimal distraction of the vehicle driver from his view of the road.

7 Claims, 2 Drawing Sheets

LAND VEHICLE NAVIGATION APPARATUS

FIELD OF THE INVENTION

The present invention relates to the field of land vehicle navigation apparatus and in particular such apparatus which calculates a desired navigational route for a vehicle between start and destination locations and provides at least visual indications to the vehicle driver with regard to implementing the navigation route.

BACKGROUND OF THE INVENTION

Land vehicle navigation systems are known in which a navigation computer receives position and heading information, as well as stored road map information, and calculates a desired navigation route between start and desired destination locations. Instructions to the vehicle driver are provided via either audible instructions and/or visual displays such that the driver will implement the desired navigation route. Philips has implemented such a system in their "CARIN" navigation system as described in Philips Technical Review, Vol. 43, No. 11/12, December 1987 and published EPC patent applications serial numbers 88201770.0 and 88201827.8 as well as other Philips publications. A similar system has also been described in the literature with regard to the United Kingdom "Autoguide" navigation system ("Autoguide-Route Guidance in the United Kingdom" by Catling and Belcher, IEEE 1989 article CH2789-6/89/0000-0467).

In such prior systems, various visual display icons are used to provide the vehicle driver with information with regard to desired vehicle maneuvers. Typically, a turn is indicated as an intersection is approached wherein the turn is visually displayed as a bent or segmented planar arrow displayed on a substantially planar CRT or LCD display screen. In addition, the Autoguide system noted above also provides a separate bar graph type indication visually depicting the amount of vehicle travel distance remaining prior to the implementation of the desired vehicle maneuver (turn).

Such systems have been found to be deficient in that they fail to rapidly sufficiently visually convey the desired vehicle maneuver to the vehicle driver and/or fail to accomplish this task while providing a visual display large enough to be easily recognized but still utilizing a minimum amount of available display space since typically the amount of available display space is very limited.

OBJECTS OF THE INVENTION

An object of the present invention is to provide an improved land vehicle navigation apparatus which overcomes the above noted deficiencies of prior land vehicle navigation apparatus.

A more particular object of the present invention is to provide an improved land vehicle navigation apparatus which more rapidly conveys to the driver of the vehicle a vehicle maneuver which should be implemented.

An additional object of the present invention is to provide an improved land vehicle navigation apparatus which can provide an easily recognizable display but utilizes a minimum amount of display space for visually indicating a desired vehicle maneuver.

BRIEF DESCRIPTION OF THE DRAWINGS

The present invention can be better understood by reference to the drawings in which.

DESCRIPTION OF THE PREFERRED EMBODIMENTS

Figure 1:
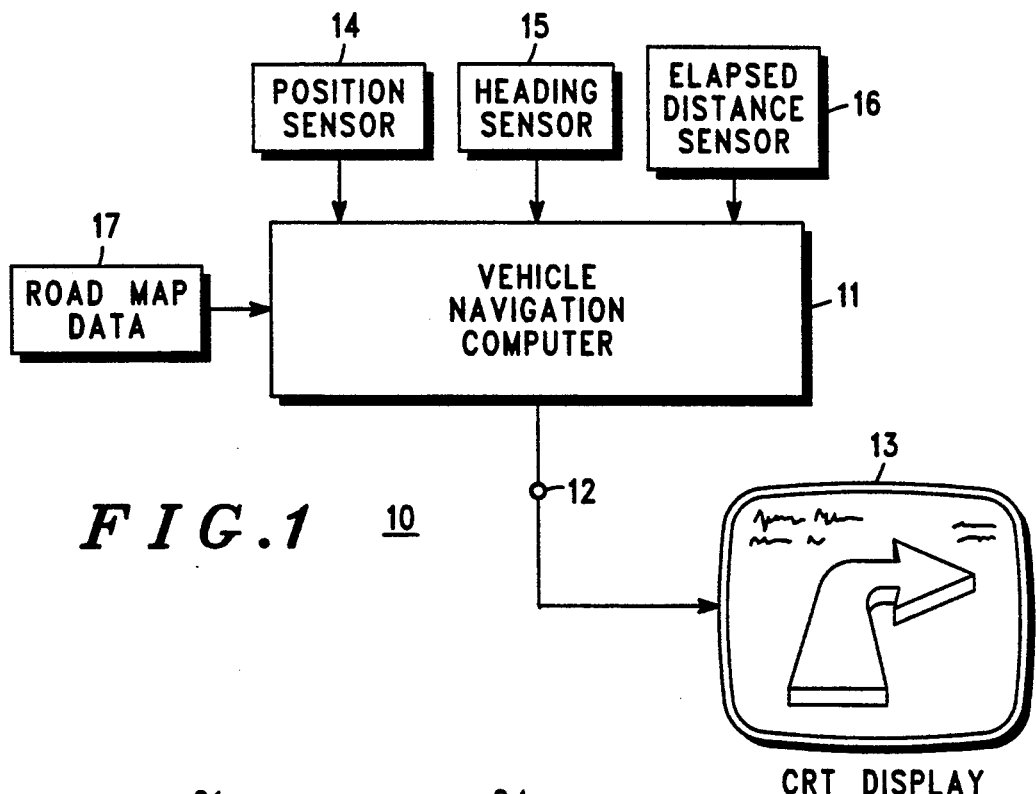
FIG. 1 is a schematic view of a land vehicle navigation apparatus constructed in accordance with the present invention.

Referring to FIG. 1, a land vehicle navigation apparatus 10 is illustrated which includes a vehicle navigation computer 11 which receives data from various sources and provides at least visual display information at an output terminal 12 which serves as an input terminal to a display apparatus 13 preferably comprising a CRT display having a substantially planar display screen. The vehicle navigation computer 11 receives its sensor data inputs from a position sensor 14, such as a GPS (Global Positioning System) position sensing receiver, a heading sensor 15, and an elapsed distance sensor 16. In addition, the computer 11 receives data with regard to existing road locations and various characteristics of these roads by virtue of stored road map data contained in a memory device 17 coupled to the computer 11. The memory device 17 may be a ROM memory contained within the computer 11 or can be road map data stored on a compact disc which is inserted into the vehicle navigation computer which includes a compact disc reader. The Philips CARIN system contemplates the use of such a compact disc reader.

The position sensor 14, as stated above, can comprise a GPS receiver, or some other type of receiver such as a Loran receiver, which periodically generates information with regard to the exact position of the receiver which is contained in a vehicle (not shown) in which the entire navigation apparatus 10 is provided. The heading sensor 15 can comprise an electronic compass in which directional headings of the vehicle are periodically sampled. Alternatively, the heading sensor 15 can comprise a differential odometer sensor in which changes in heading direction are determined by the difference in wheel rotation between two different wheels. The heading sensor 15 can also comprise both of these sensors which are appropriately weighted by the vehicle navigation computer. Literature relating to the Philips CARIN system explains how this can be achieved. The elapsed distance sensor 16 comprises essentially an odometer for the vehicle which measures distance traveled by the vehicle. This can be just the average of two separate wheel sensors each of which measures distance traveled whereas the difference between these two wheel sensors can be utilized for determining changes in heading direction such as provided by the heading sensor 15.

Essentially, the driver of a vehicle will input to the vehicle navigation computer, or the vehicle navigation computer will have automatically inputted to it, the initial position of the vehicle. Then a destination location for the vehicle will be selected by the driver and the vehicle navigation computer will, utilizing the road map data stored in the location 17, compute an optimum vehicle navigation course in accordance with the desires of the vehicle operator and various road characteristic data stored in the road map data location 17. The Autoguide and Philips CARIN systems readily implement such a function which is well within the capabilities of those who are skilled in the art. The vehicle navigation computer 11 then provides visual displays to the vehicle operator that indicate the types of vehicle maneuvers to be implemented so as to have the vehicle travel along the desired calculated navigation route. In addition, audible indications to the vehicle operator can also be provided by the vehicle navigation computer and an enunciator, but this forms no part of the present invention.

As the vehicle is moving the navigation computer 11 at the terminal 12, provides information to the display device 13 with regard to the next vehicle maneuver to be implemented. This maneuver can be any sort of turn, such as the turn illustrated in FIG. 2, or it can be some other type of instruction, including proceeding in a straight line, such as the illustration shown in FIG. 3. Essentially, the land vehicle navigation apparatus 10 in FIG. 1 operates in accordance with the flow chart shown in FIG. 4 which implements the programming of the vehicle navigation computer 11. FIG. 4 illustrates the general operation of the navigation apparatus 10 in providing the visual display for the CRT display 13. The improvement implemented by the present invention relates to the manner in which information is visually displayed on the CRT display 13 by the vehicle navigation computer 11. This information is provided to the vehicle driver as to the desired vehicle maneuvers to be implemented and is provided in an efficient visual format, utilizing a minimal amount of display space, so that a larger visual can be provided.

Referring to FIG. 4, a flow chart 100 is illustrated. The initial step 101 relates to the vehicle navigation computer 11 receiving its input signals and the desired start and destination locations and calculating a navigation route for the vehicle. This route is calculated via fixed road paths which are defined by the road map data stored in memory location 17. Prior systems readily implement this general function of the present invention.

Process block 102 determines, sequentially, the vehicle maneuvers which are needed at various road positions along the calculated navigation route. Block 102 also determines the current vehicle position with respect to such road positions. Both the Philips and Autoguide systems noted above appear to implement such a function.

Process block 103 then utilizes the vehicle maneuvers determined by block 102 to provide the driver with at least a visual display of vehicle maneuvers to be implemented at sequential road positions encountered along the navigation route. It is the format of the visual maneuver display implemented by the present invention which distinguishes process block 103 of the present invention from the prior art visual displays provided by the prior systems. Per process block 104, the present invention superimposes on the vehicle maneuver visual display a contrasting bar graph type graph which indicates the remaining distance that exists before a maneuver implementation is to occur. While the Autoguide system noted above implements a bar graph indicative of the proximity of the vehicle to the implementation of a maneuver, the Autoguide system provides this information on a display portion separated apart from the visual display of the maneuver to be implemented. This requires the use of additional display space and, more significantly, requires the vehicle operator to concentrate on two separated visual display portions which are intended to convey information about the occurrence of a desired vehicle maneuver. This is undesirable since it can readily lead to confusion with regard to when a vehicle maneuver is to occur because it divides the operator's attention between the type of maneuver to be implemented and its time occurrence by requiring him to focus on separated displays of this type of information.

Figure 2:
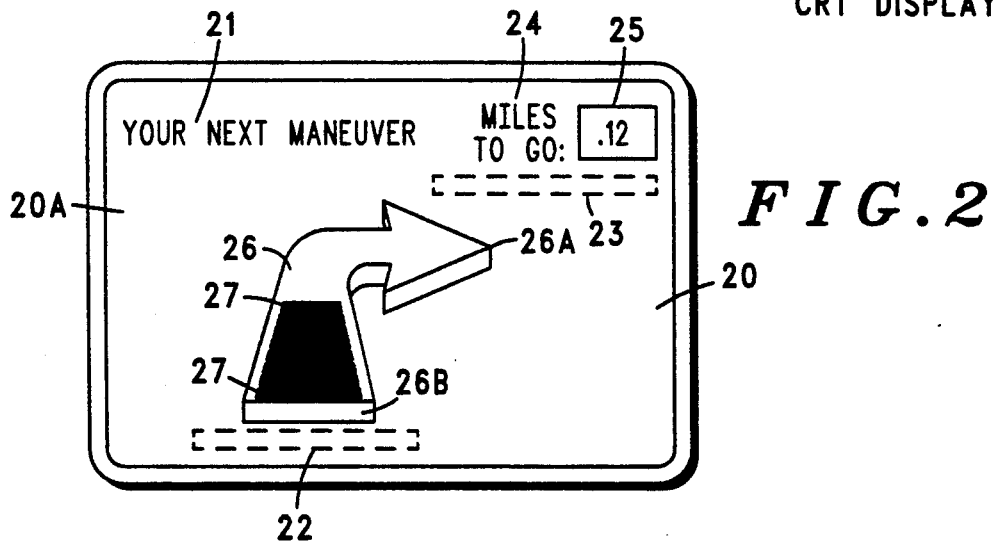
FIG. 2 is an enlarged planar view of a visual vehicle maneuver display provided by the present invention.

Referring now to FIG. 2, the preferred type of visual display information for the present invention is illustrated for implementing, for example, a conventional 90©right angle turn. FIG. 2 illustrates a planar CRT display screen 20, having a background 20A, which forms part of the CRT display device 13. The display screen 20 has a legend 21 which identifies this display as illustrating "YOUR NEXT MANEUVER". This is because the display screen 20 maybe used in other modes to display other types of information. A road legend 22 is also displayed on the screen 20 and this indicates the name of the current road on which the vehicle is traveling. An additional road legend 23 is illustrated and this indicates the name of the road on to which the vehicle is to make a right hand turn. A legend 24 is illustrated having the wording "MILES TO GO" adjacent a displayed numeric value 25 indicative of the amount of additional vehicle distance travel to be implemented prior to the implementation of the desired right hand turn.

A key feature of the present invention is the providing of the visual display which indicates the type of vehicle maneuver to be implemented. In FIG. 2 this display is implemented by providing a visual arrow graphic representation 26, having a head 26A and tail 26B, indicative of the desired vehicle maneuver. In FIG. 2, this maneuver is a right hand turn. Significantly, the displayed arrow graphic representation 26 shown in FIG. 2 is illustrated in perspective form as an arrow with the tail 26B of the arrow being shown in the foreground and the head 26A of the arrow being shown in the background. The term "perspective" is use to indicate that the graphic arrow 26 is shown in a drawing in which lines of the drawings, as they travel away from the observer, appear to converge at a point at infinity. Certainly this is the case for the lines of the arrow 26 which travel from the bottom of the screen towards the top. The beginning tail 26B of the arrow 26 is located in the foreground towards the bottom of the display screen 20 and the arrow extends upward and vertically to a point inwards of the display screen 20. For turns, the arrow extends upward from the bottom of the screen in a vertical direction and then the sorrow 26 turns, by at least 15°, towards termination of the arrow at its head portion 26A.

It is significant that the arrow 26 is shown in perspective in the manner described above since this more readily communicates to the operator of the vehicle the desired movement of the vehicle to be implemented at the next vehicle maneuver. This is because the use of a perspective arrow more readily and efficiently indicates to the driver the desired vehicle movement with regard to the present vehicle movement. Present vehicle movement is indicated by the arrow's upward perspective extension from its tail portion 26B. In addition, preferably the arrow 26 is illustrated as a solid color (preferably yellow) figure provided on a contrasting solid color background (preferably greenish-blue) for the screen background 20A. Also, preferably the arrow 26 is illustrated in three dimensional form as having length, width and thickness dimensions. These characteristics have been found to more readily and efficiently identify to the vehicle operator the desired vehicle maneuver. This also provides an aesthetically more pleasing visual image to the vehicle operator.

An additional feature of the present invention is that the arrow 26 is provided with bar graph type data which is visually superimposed on the arrow 26 wherein this bar graph data preferably comprises a series of solid red color horizontal bars 27. Preferably 8 of such bars are initially provided on the arrow 26 when the vehicle is a predetermined distance from the implementation of a desired vehicle maneuver indicated by the arrow 26. The number of bars correlates to the MILES TO GO location indicated by the visually displayed graphics 24 and 25. As the vehicle approaches the road position at which the vehicle maneuver is to occur, the MILES TO GO information displayed at the location 25 is decremented, but also the number of horizontal bars 27 is decremented, from the bottom towards the top as seen in FIG. 2, to readily indicate to the vehicle operator the proximity of the next vehicle maneuver to be implemented. Also, preferably the bars 27 are shown having different horizontal lengths so as to correspond to the perspective representation of the arrow 26.

By superimposing the distance to go information before the next vehicle maneuver on the arrow 26, a minimal amount of display space is utilized. Thus the size of the arrow 26 can now be larger, and therefore easier to see, since there is no need for a visually separated bar graph. In addition, this superimposition of next vehicle maneuver and proximity of the vehicle to the implementation of this maneuver assists the vehicle operator in more rapidly determining when the desired maneuver is to be implemented. It should be realized that most vehicle operators must maintain eye contact with the road and that therefore only momentarily may they glance at the display screen 20. The present implementation of the preferred visual display allows the vehicle operator to determine at a glance not only what maneuver is to be implemented next but also how close the vehicle is to the road location at which this maneuver is to be implemented.

Preferably, the arrow 26 may be displayed without any bar graph information when a substantial distance exists prior to the vehicle implementing its displayed maneuver. When the vehicle is within a predetermined distance range of the intersection at which the maneuver is to occur, then an audible alert can be implemented and an 8 segment bar graph of the bars 27 can be displayed. These bars are preferably displayed as having a different visual characteristic from the arrow 26 such as differing from the arrow 26 in either intensity and/or color. Also, the predetermined distance at which the bars 27 initially appear superimposed on the arrow 26 can be a function of not only distance but also vehicle speed since for a faster moving vehicle these bars should occur at an earlier point in time.

Figure 3:
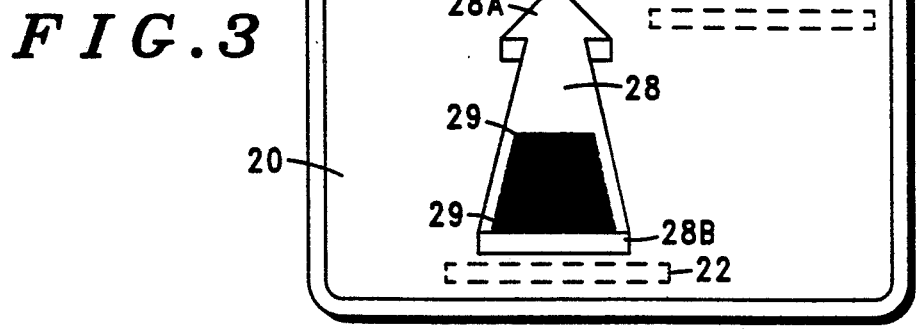
FIG. 3 is an alternative vehicle maneuver visual display which may be provided by the navigation apparatus in FIG. 1.
Figure 4:
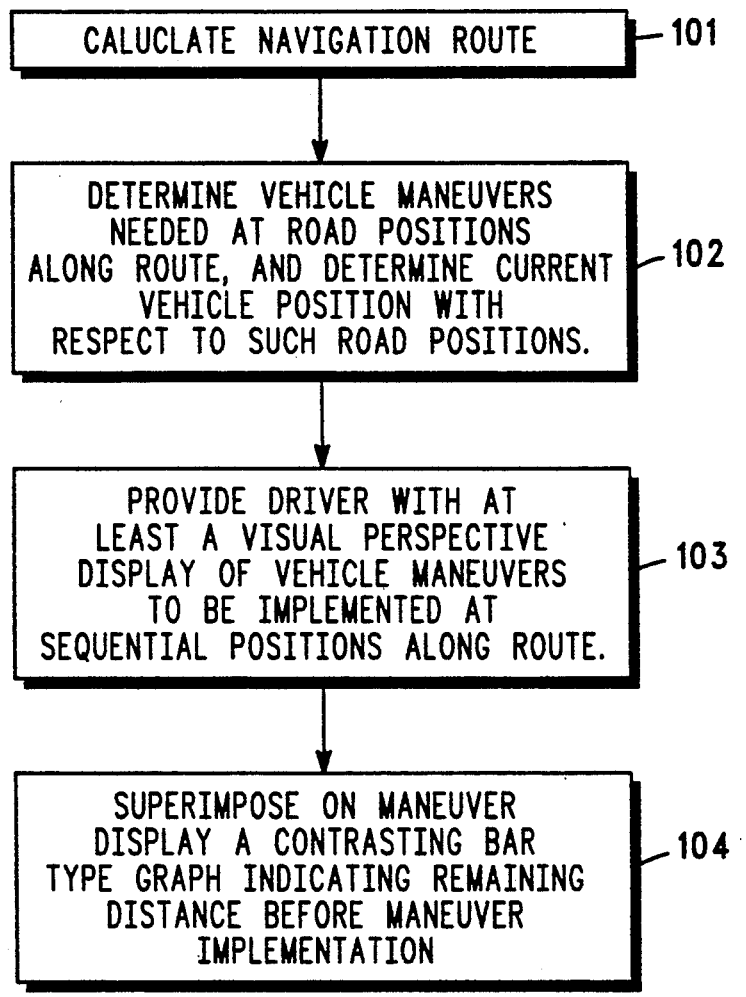
FIG. 4 is a flow chart which illustrates the operation of the vehicle navigation apparatus shown in FIG. 1 in accordance with the programming of a vehicle navigation computer which forms a component of this apparatus.

FIG. 3 illustrates that the vehicle maneuver which is to occur may just be continuing in a straight direction until a specific location is achieved. Thus FIG. 3 illustrates an arrow 28 having bars 29 wherein the arrow, again drawn as a three dimensional solid figure in perspective form, extends in a straight line.

In implementing the visual displays shown in FIGS. 2 and 3, a Macintosh computer was programmed. Essentially, prestored characteristics of various arrows to be displayed was implemented in pixel form on a Macintosh computer CRT by use of various drawing programs, such as "Superedit" which is an 8 bit color graphic editing program for the Macintosh computer. These prestored pictures depicting various types of desired vehicle maneuvers, such as various turns, are then merely called up by the vehicle navigation computer 11 when desired. The bar graphs 27 are then separately implemented in accordance with instructions from the vehicle navigation computer 11 and preferably are created by calling built in QuickDraw functions by the Macintosh operating system software. Creating the desired displays described above is readily within the capabilities of those of average skill in the art once the present invention has taught the desirability of providing visual displays with the characteristics noted above.

While I have shown and described specific embodiments of this invention, further modifications and improvements will occur to those skilled in the art. All such modifications and improvements which retain the basic underlying principles disclosed and claimed herein are within the scope this invention.

I claim:

1. Land vehicle navigation apparatus comprising:
   means for calculating a desired navigational route for a vehicle, via fixed road paths, between a start location and a desired destination location;
   means for determining desired vehicle maneuvers at predetermined road locations along said navigation route, and
   display means coupled to said vehicle maneuver determining means for receiving vehicle maneuver information therefrom and for visually displaying to a driver of the vehicle on a display screen said desired vehicle maneuvers to be implemented at said predetermined road locations,
   wherein the improvement comprises said maneuver determining means providing data to said display means such that said display means indicates said desired vehicle maneuvers by providing a visual arrow graphic representation;
   wherein said means for determining said desired vehicle maneuvers at said predetermined road locations also includes means for providing data indicating the distance of additional vehicle travel which must be implemented prior to the execution of said calculated desired vehicle maneuver, and wherein said additional distance travel data is visually displayed on said display means as an effective bar graph which is superimposed on and displayed within and without touching boundaries of said visually displayed arrow graphic representation.

2. Land vehicle navigation apparatus according to claim 1 wherein said bar graph is displayed with a different visual characteristic than said arrow graphic representation.

3. Land vehicle navigation apparatus according to claim 2 wherein said bar graph is displayed as a series of stacked horizontal separated bars superimposed on said arrow graphic representation, horizontal ends of said bars positioned separate from and within boundaries of said arrow graphic representation.

4. Land vehicle navigation apparatus according to claim 3 wherein said arrow graphic representation is displayed as a solid figure having a predetermined color and wherein said bars are displayed in a color different from the color of said arrow graphic representation.

5. Land vehicle navigation apparatus according to claim 1 wherein said arrow graphic representation has a tail shown toward the bottom of said display screen and a head shown inwards of said display screen and wherein said maneuver determining means includes means for providing, in the event of a turn maneuver, data indicating the name of the road on which the vehicle is currently traveling and the name of the road onto which the vehicle will turn, and wherein said names are visually displayed as road legends on said display screen.

6. Land vehicle navigation apparatus according to claim 5 wherein said current travel road name legend is displayed adjacent the tail of said arrow graphic representation and said road name legend of the road onto which the vehicle will turn is displayed adjacent the head of said arrow graphic representation.

7. Land vehicle navigation apparatus according to claim 1 wherein said arrow graphic representation is provided as a solid figure having a predetermined color.

* * * * *